(12) United States Patent
Kosaka et al.

(10) Patent No.: US 9,272,624 B2
(45) Date of Patent: Mar. 1, 2016

(54) DISPLAY APPARATUS FOR VEHICLE

(71) Applicant: Nissan Motor Co., Ltd., Kanagawa (JP)

(72) Inventors: Norio Kosaka, Kanagawa (JP); Hiroshi Watanabe, Kanagawa (JP); Itaru Kanazawa, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 0 days.

(21) Appl. No.: 14/387,934

(22) PCT Filed: Mar. 15, 2013

(86) PCT No.: PCT/JP2013/057464
§ 371 (c)(1),
(2) Date: Sep. 25, 2014

(87) PCT Pub. No.: WO2013/146366
PCT Pub. Date: Oct. 3, 2013

(65) Prior Publication Data
US 2015/0046029 A1    Feb. 12, 2015

(30) Foreign Application Priority Data

Mar. 29, 2012 (JP) .................................. 2012-076744

(51) Int. Cl.
G06F 7/00 (2006.01)
B60Q 1/00 (2006.01)
B60K 37/02 (2006.01)

(52) U.S. Cl.
CPC ......... B60K 37/02 (2013.01); *B60K 2350/1064* (2013.01); *B60K 2350/1092* (2013.01)

(58) Field of Classification Search
USPC ........................................... 701/36; 340/439
See application file for complete search history.

(56) References Cited

U.S. PATENT DOCUMENTS

2009/0143934 A1* 6/2009 Motonaga et al. .............. 701/29
2010/0097202 A1* 4/2010 Watanabe et al. ............. 340/439

(Continued)

FOREIGN PATENT DOCUMENTS

EP        2832589 A1 *  2/2015
JP    2008-260314 A    10/2008

OTHER PUBLICATIONS

International Search Report for corresponding International Application No. PCT/JP2013/057464, mailed May 21, 2013 (2 pages).

(Continued)

*Primary Examiner* — Thomas G Black
*Assistant Examiner* — Tyler Paige
(74) *Attorney, Agent, or Firm* — Osha Liang LLP (57) ABSTRACT

A display apparatus for vehicle includes a speedometer that measures speed of a vehicle, an eco-drive level determination unit that determines an eco-drive level at driving the vehicle based on a recommended depression amount and an actual depression amount, a determination display portion located inside a peripheral visual field region of the driver, a detail display portion located outside of the peripheral visual field region, and a display control unit that controls display in the determination display portion and the detail display portion. The display control unit performs the following controls of (A) setting the display in the determination display portion to ambient display in which contrast of the outline region is lower than contrast inside the outline region, and (B) changing the ambient display according to the change in the eco-drive level.

15 Claims, 7 Drawing Sheets

(56) References Cited

U.S. PATENT DOCUMENTS

2010/0259374 A1* 10/2010 Matsuo et al. ............... 340/439
2015/0046029 A1* 2/2015 Kosaka et al. ................ 701/36

OTHER PUBLICATIONS

Written Opinion for corresponding International Application No. PCT/JP2013/057464, mailed May 21, 2013 (3 pages).

* cited by examiner

DISPLAY APPARATUS FOR VEHICLE

BACKGROUND

1. Technical Field

The present invention relates to a display apparatus for vehicle which displays an eco-drive level meter installed in a vehicle in such a manner that a driver can easily recognize the eco-drive level meter.

2. Related Art

Patent Literature 1 describes an eco-drive level meter (an ECO meter) which is installed in a vehicle and indicates the degree of how the acceleration operation by the driver is eco-drive. Such an ECO meter calculates a recommended depression amount, which is an amount of depression of an accelerator that implements eco-drive, based on the load condition during the traveling of the vehicle, and represents the difference between the recommended depression amount and an actual amount of depression of the accelerator that the driver depresses, on an eco-drive meter such as a liquid crystal display. In such a manner, the eco-drive level meter can cause the driver to recognize the current eco-drive level. Moreover, the representation of the eco-drive level prompts the driver to try eco drive.

CITATION LIST

Patent Literature

Patent Literature 1: Japanese Patent Application Publication No. 2008-260314

SUMMARY

However, the conventional eco-drive level meter described in Patent Literature 1 has such a layout that during the traveling of the vehicle, the driver voluntarily changes the line of vision to see the indicator and thereby finds the instantaneous fuel consumption. Accordingly, it is difficult to prompt the driver to recognize that eco-drive is not being performed.

One or more embodiments of the present invention is to provides a display apparatus for vehicle which can prompt the driver who is not performing eco-drive to direct the driver's line of vision toward the eco-drive level meter without distracting the driver.

A display apparatus for vehicle according to an aspect of the present invention includes: a speedometer configured to measure speed of a vehicle; and an eco-drive level determination unit configured to determine an eco-drive level at driving the vehicle based on a difference between a recommended depression amount which is a recommended amount of depression of an accelerator and an actual depression amount which is an actual amount of depression of the accelerator that the driver depresses. The apparatus further includes: a determination display portion located inside a peripheral visual field region of the driver and configured to display information indicating a result of the determination by the eco-drive level determination unit; and a detail display portion located outside of the peripheral visual field region and configured to display information representing a comparison between the recommended depression amount and the actual depression amount. The apparatus still further includes a display control unit configured to control display in the determination display portion and the detail display portion, and the display control unit performs the following controls of: (A) setting the display in the determination display portion to ambient display in which contrast of an outline region is lower than contrast inside the outline region, and (B) changing the ambient display according to change in the eco-drive level based on the result of the determination by the eco-drive level determination unit.

BRIEF DESCRIPTION OF DRAWINGS

FIG. 7($a$) is a characteristic diagram showing a relationship between the eco-drive level and the display area of the ambient image in the display apparatus for vehicle according to the embodiment, and FIG. 7($b$) is a characteristic diagram showing a relationship between the eco-drive level and time frequency.

DETAILED DESCRIPTION

Hereinafter, a description is given of embodiments of the present invention with reference to the drawings. The dimensional proportions in the drawings are exaggerated for the convenience of description and are sometimes different from actual ones. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

First Embodiment

Figure 1:
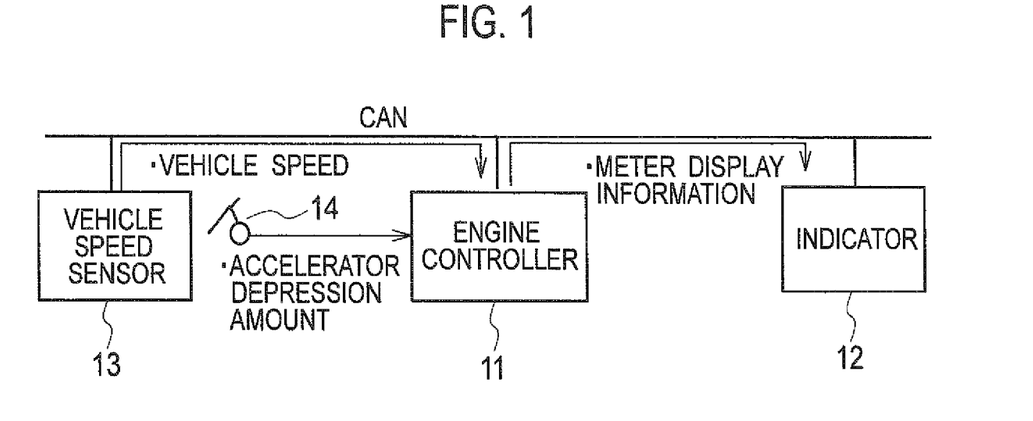
FIG. 1 is a block diagram illustrating the configuration of a vehicle control system including a display apparatus for vehicle according to an embodiment of the present invention.

FIG. 1 is a block diagram illustrating the configuration of a main portion of a vehicle control apparatus including a display apparatus for vehicle according to a first embodiment of the present invention. As illustrated in the example of FIG. 1, the vehicle control apparatus can be configured to include an engine controller 11, an indicator 12, and a vehicle speed sensor 13. The indicator 12 and the vehicle speed sensor 13 can be connected to the engine controller 11 through a controller area network (CAN).

Figure 2:
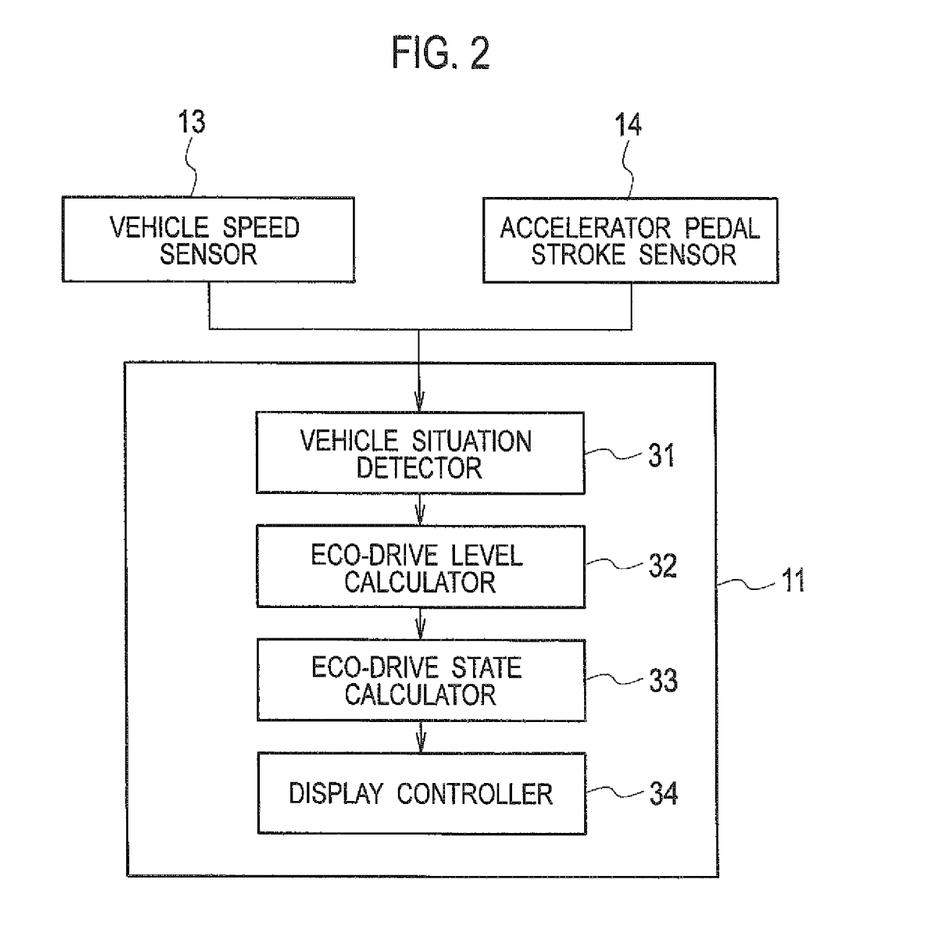
FIG. 2 is a block diagram illustrating the detailed configuration of an engine controller of the display apparatus for vehicle according to the embodiment.

As illustrated in the example of FIG. 2, the engine controller 11 can be configured to include a vehicle situation detector 31, an eco-drive level calculator 32, and an eco-drive state calculator 33, and a display controller 34. In the aforementioned example, the engine controller 11 is connected to a stroke sensor 14 of an accelerator pedal and acquires the amount of depression of the accelerator which is detected by the stroke sensor 14. The engine controller 11 also acquires vehicle speed data outputted from the vehicle speed sensor 13. The amount of depression of the accelerator is used for the same meaning as accelerator opening.

The vehicle situation detector 31 illustrated in FIG. 2 can detect the traveling state of the vehicle based on the current vehicle speed and the amount of depression of the accelerator and calculate a recommended depression amount of the accelerator for implementing eco-drive based on the detected traveling state. Specifically, in this specification, the recommended depression amount means an amount of depression of the accelerator which is recommended to realize eco-drive. Moreover, the eco-drive means fuel-efficient drive, which can be drive which reduces the exhaust gas emission or fuel consumption, for example. Note that, in the example illustrated in FIG. 2, the recommended depression amount is determined based on the vehicle speed and the amount of depression of the accelerator; however, the present invention is not limited to such a configuration. Specifically, the recommended depression amount can be determined in consideration of various factors including the presence or absence of slope in addition to the aforementioned factors.

In this embodiment, the eco-drive level calculator 32 calculates the eco-drive level of the current driving state based on the relationship between the recommended amount of depression of the accelerator and an actual amount of depression of the accelerator that the driver depresses. Hereinafter, in contrast to the recommended depression amount, the actual amount of depression of the accelerator that the driver depresses is referred to as an actual depression amount in some cases. As described above, the eco-drive level calculator 32 includes a function as an eco-drive level determination unit to determine the eco-drive level at driving the vehicle based on the difference between the recommended depression amount and the actual depression amount of the accelerator.

In this embodiment, the eco-drive state calculator 33 can classify the eco-drive level of the current driving state into three grades based on the eco-drive level calculated by the eco-drive level calculator 32. To be specific, based on the difference between the recommended depression amount and the actual depression amount, it can be determined into which state the current eco-drive level is classified among an "eco-drive state," a "transition state," and a "non-eco drive state." The "eco-drive state" is a state corresponding to a predetermined range set in the case where the difference between the recommended depression amount and the actual depression amount is smaller than a predetermined threshold previously set. In this case, it is considered that eco-drive is being implemented. The "transition state" is a state corresponding to a range (a) set in the case where the difference is larger than the difference corresponding to the eco-drive state. The "non-eco drive state" is a state corresponding to a range (b) set in the case where the difference is larger than the difference corresponding to the transition state. In the "non-eco drive state," the difference is large, and eco-driving is not being executed. The "transition state" is a state between the "eco-drive state" and the "non-eco drive state" and is desired to quickly transition to the "eco-drive state." In other words, the eco-drive state calculator 33 has a function as an eco-drive state calculation unit to determine which one of the three continuous ranges corresponding to the eco-drive, transition, and non-eco drive states includes the current eco-drive level. The above description is not intended to limit the classification into the three grades as shown in the above example. The display apparatus for vehicle can be configured to be provided with multiple grades for implementing more severe control.

In this embodiment, the display controller 34 can vary the style displayed on the indicator 12 by a later-described method depending on the states classified into the above-described three grades.

Figure 3:
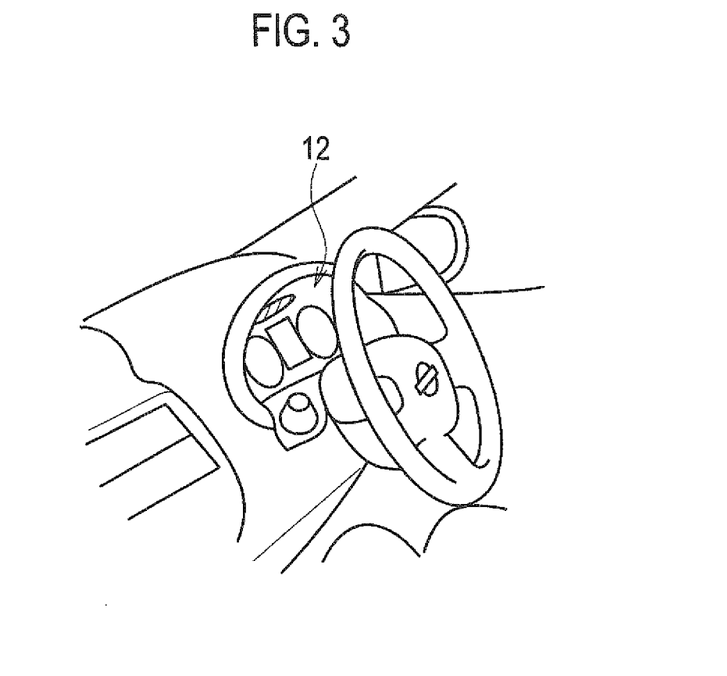
FIG. 3 is an explanatory view showing the display apparatus for vehicle according to the embodiment which is installed in a vehicle.
Figure 4:
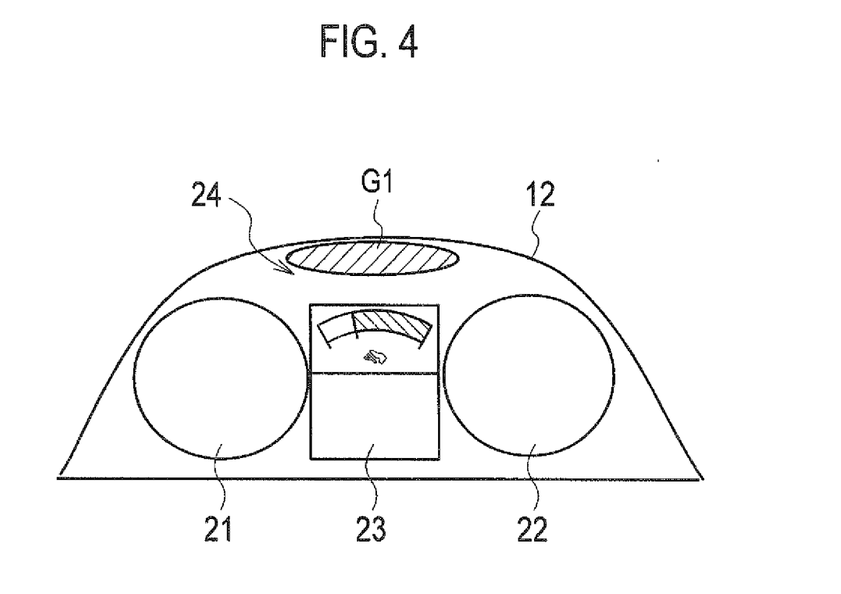
FIG. 4 is an explanatory view illustrating a display example displayed on an indicator of the display apparatus for vehicle according to the embodiment.

As illustrated in FIG. 3, the indicator 12 illustrated in FIG. 1 can be installed in an instrument panel of the vehicle interior and can be configured with a liquid crystal panel, for example. Moreover, as illustrated in the example of FIG. 4, the indicator 12 can be configured such that an engine tachometer 21 is displayed in the left side and a speedometer 22 is displayed in the right side. In the example described above, the area between the engine tachometer 21 and speedometer 22 serves as a detail display portion 23, and the area above the detail display portion 23 serves as a determination display portion 24.

Figure 8:
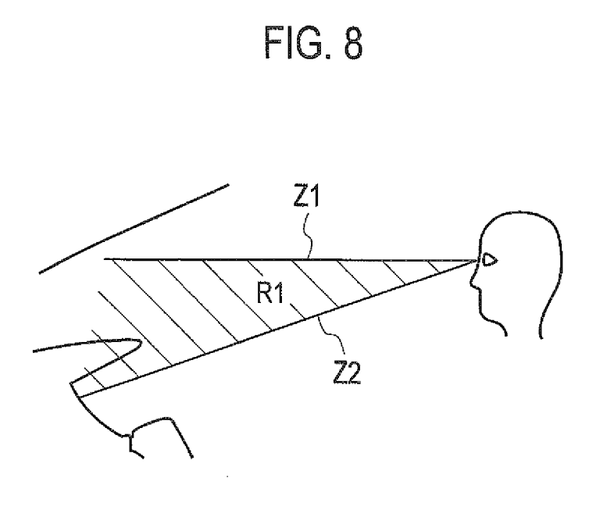
FIG. 8 is an explanatory view illustrating a driver's peripheral visual field region in the display apparatus for vehicle according to the embodiment.

In this embodiment, a lower region R1 in a central viewing direction Z1 of the driver is referred to as a peripheral visual field region as illustrated in FIG. 8. In this specification, the "peripheral visual field region" refers to a range in which the driver can see displayed objects only by moving the driver's line of vision without moving his/her face up and down. In the example of FIG. 8, the lower limit of the peripheral visual field region is indicated by Z2. The above-described determination display portion 24 is provided within the peripheral visual field region. The peripheral visual field region in this embodiment can be previously set by inputting the driver's body information and the like.

Figure 9:
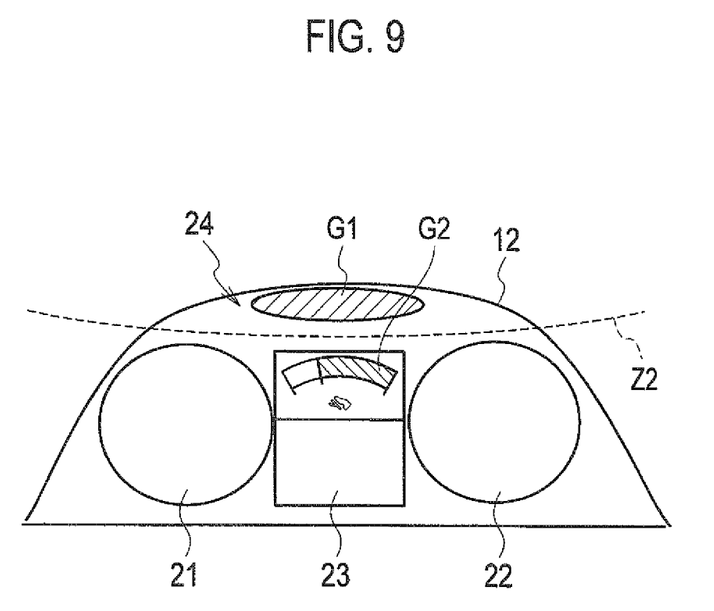
FIG. 9 is an explanatory view showing the relationship between the indicator and the peripheral visual field region in the display apparatus for vehicle according to the embodiment.

Furthermore, the region under the peripheral visual field region is a region under the Z2 illustrated in FIG. 8 and is a region that the driver can see by slightly moving his/her face down, that is, a region that the driver cannot see unless the driver tries to see the same intentionally. In this embodiment, the detail display portion 23 is located in a region outside of the peripheral visual field region described above. As illustrated in FIG. 9, the determination display portion 24 in the indicator 12 is located within the peripheral visual field region while the detail display portion 23 under the same is located outside of the peripheral visual field region.

Figure 6:
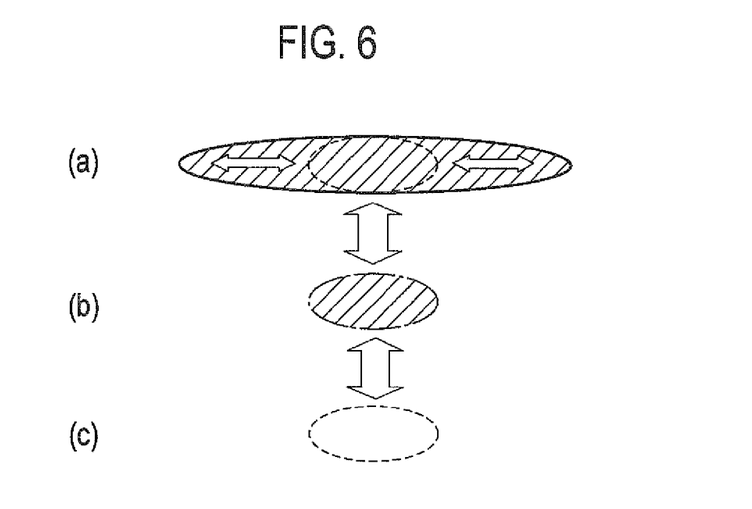
FIG. 6 is an explanatory view illustrating changes of an ambient image displayed on a determination display portion of the display apparatus for vehicle according to the embodiment.

The determination display portion 24 displays an ambient image G1. The display style of the ambient image G1 varies depending on whether the driving state is the eco-drive state, non-eco drive state, or transition state. Specifically, when the driving state is the eco-drive state, the ambient image G1 is displayed in a horizontally-long ellipse and has a low contrast in the outline region as illustrated in the determination display portion 24 of FIG. 4. When the current driving state changes to the transition state or the non-eco drive state, at least one of the display region and display profile of the ambient image G1 is changed. By such control, it is possible to naturally direct the driver's line of vision toward the ambient image G1 without distracting the driver as shown in FIG. 6 described later. In the detail display portion 23, an eco-drive level meter is displayed, which causes the driver to recognize the comparison between the recommended depression amount and the actual depression amount of the accelerator.

Figure 5:
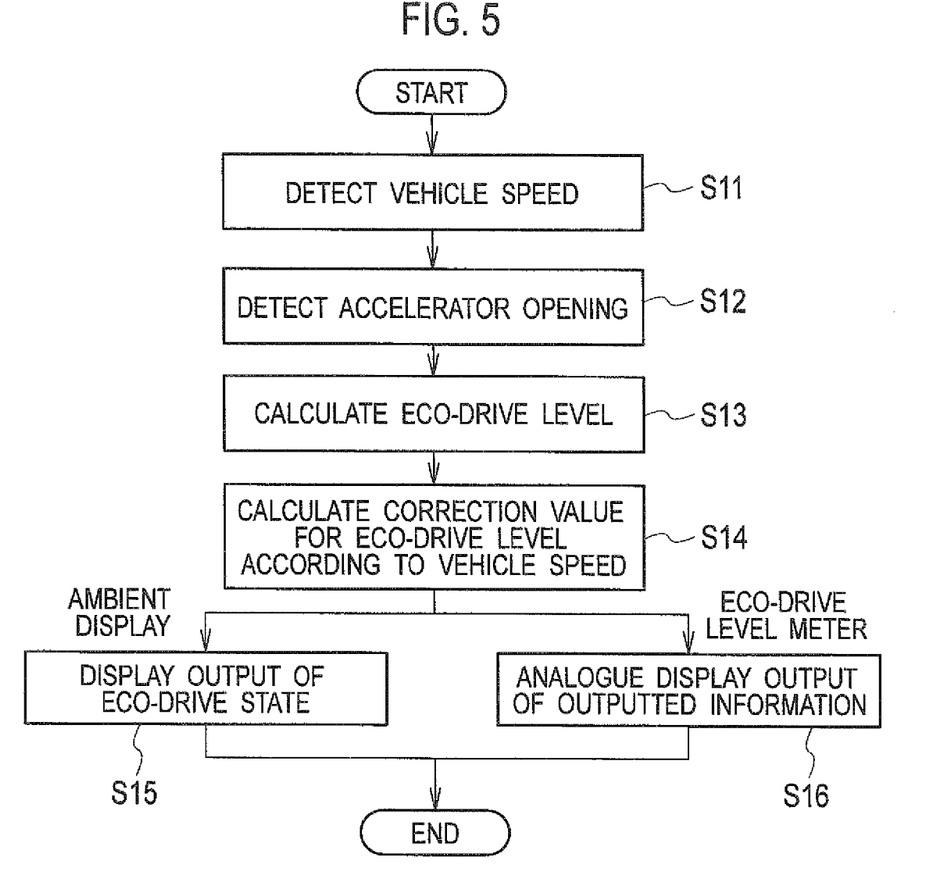
FIG. 5 is a flowchart showing a processing operation of the display apparatus for vehicle according to the embodiment.

Next, an example of the operation of the display apparatus for vehicle according to the first embodiment configured as described above is described with reference to the flowchart shown in FIG. 5.

First, in Step S11, the vehicle situation detector 31 acquires vehicle speed data detected by the vehicle speed sensor 13. Next, in Step S12, the vehicle situation detector 31 acquires the amount of depression of the accelerator (accelerator opening) detected by the stroke sensor 14.

In Step S13, based on the vehicle speed and the amount of depression of the accelerator, the eco-drive level calculator 32 calculates the amount of depression of the accelerator which can implement eco-drive at the current vehicle travel, that is, the recommended depression amount. Furthermore, the eco-drive level calculator 32 calculates the eco-drive level at the current travel state based on the difference between the actual depression amount and the recommended depression amount of the accelerator.

In Step S14, the eco-drive level calculator 32 calculates a correction value of the eco-drive level according to the vehicle speed detected in Step S11 for correcting the eco-drive level. Based on the corrected eco-drive level, the eco-drive state calculator 33 determines the state that the vehicle traveling state falls into among the "eco-drive state," "non-eco drive state," and "transition state."

In Step S15, the display controller 34 displays an ambient image according to the results of determination of the eco-drive level on the determination display portion 24. The display style thereof is described later.

In Step S16, on the detail display portion 23, the display controller 34 displays the eco-drive level meter by which the driver can recognize the comparison between the recommended depression amount and the actual depression amount of the accelerator.

Next, the ambient image is described. In the ambient image, the contrast in the outline region is set smaller than that inside the outline region. The ambient image is therefore indistinct to an observer compared with the other displayed objects. Moreover, the brightness of the ambient image periodically changes over time. The contrast herein is a difference in brightness between a portion where an image is displayed and a portion where no image is displayed in the determination display portion 24. The outline region of the ambient image is a region which extends in the circumferential direction at the outer periphery of the ambient image and has a predetermined width. The brightness of the ambient image may be configured to gradually increase from the outside toward the inside in the outline region, for example. The ambient image is thereby made indistinct as described above. Since the display controller 34 displays the ambient image in this embodiment, it is possible to cause the driver to sense the ambient display without distracting the driver, thus preventing vehicle driving as a major operation from being disturbed.

The degree of change in the brightness of the ambient image over time is represented by "time frequency." Specifically, the time frequency is high when the rate of change in the brightness is high, and the time frequency is low when the rate of change in the brightness is low.

FIG. 6 is an explanatory view illustrating an example of changes of the display region of the ambient image in the determination display portion 24. FIG. 6(a) illustrates display at the eco-drive state. FIG. 6(b) illustrates display at the transition state. FIG. 6(c) illustrates display at the non-eco drive state. The regions represented by diagonal lines in the drawings show regions which are illuminated, and the blank regions show regions which are not illuminated.

As illustrated in FIG. 6(a), when the vehicle driving state is the eco-drive state, an ambient image having a horizontally-long elliptical illuminated region is displayed. As previously described, the ambient image is displayed with the contrast in the outline region set lower than that inside the outline region. The ambient image in this case is displayed in such a manner that the brightness changes at a high time frequency.

Moreover, when the difference between the recommended depression amount and the actual depression amount increases and the vehicle driving state becomes the transition state, the ambient image illustrated in FIG. 6(b) is displayed. Specifically, the displayed ambient image has a narrower illuminated region that is changed into an elliptical profile having a smaller horizontal width than the profile shown in FIG. 6(a). The ambient image is displayed in such a manner that the brightness changes at a lower time frequency than that set at the eco-drive state.

Furthermore, in the example of FIG. 6(c) corresponding to the case where the vehicle driving state is the non-eco drive state, the ambient image is erased.

In addition, the display controller 34 illustrated in the example of FIG. 2 displays the ambient image on the determination display portion 24. Moreover, the display controller 34 can change the illuminated region and time frequency of the ambient image as described above according to a change in the vehicle driving state. In other words, the display controller 34 has a function as a display control unit to cause the determination display portion 24 to represent ambient display having a low contrast in the outline region. Furthermore, the display controller 34 also has a function as a display control unit to change the ambient display when the eco-drive level is changed as the result of determination by the eco-drive level calculator 32 (eco-drive level determination unit) or the eco-drive state calculator 33.

Figure 7:
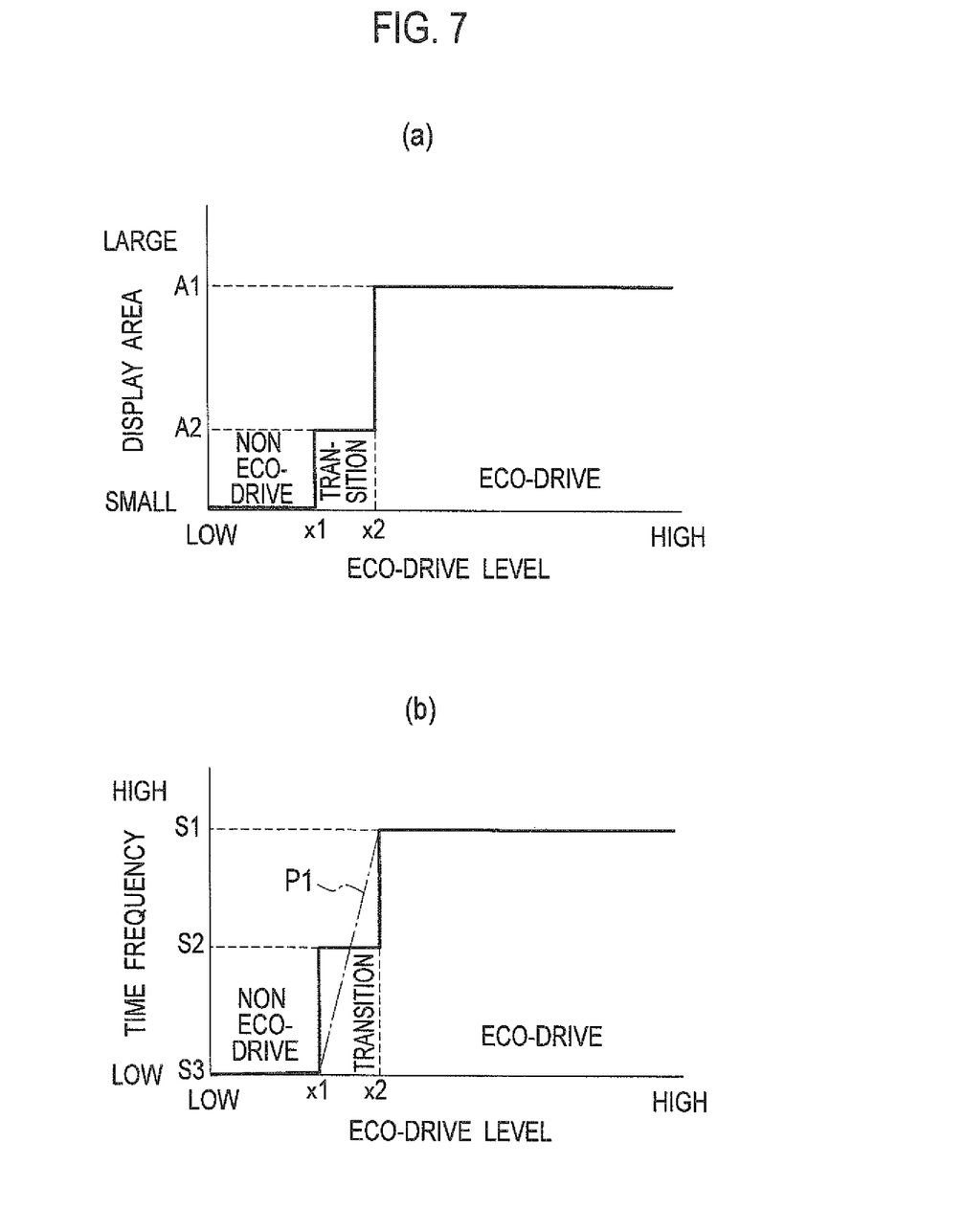

In the display apparatus for vehicle of this embodiment, as illustrated in FIG. 7(a), when the eco-drive level decreases from a high level to less than x2, the driving state changes from the eco-drive state to the transition state. In this process, it is desirable that control is performed so that the area of the ambient image is reduced instantly, not gradually. Specifically, when the eco-drive level decreases to less than x2, the area of the ambient image instantly changes stepwisely from A1 to A2. Furthermore, when the eco-drive level decreases to less than x1, the area of the ambient image instantly changes stepwisely from A2 to non-display. By changing the area of the ambient image instantly as described above, the driver can easily notice that the ambient image has changed. Accordingly, in this embodiment, it is preferable that as the driving state changes from the eco-drive state to the transition state and to the non-eco drive state, the illuminated region of the ambient image is stepwisely narrowed to be finally erased.

As illustrated in FIG. 7(b), when the eco-drive level decreases from a high level to less than x2, the driving state changes from the eco-drive state to the transition state. In this process, it is preferable that the time frequency of the ambient image instantly changes from S1 (corresponding to a large change in brightness) to S2 (corresponding to a small change in brightness). Furthermore, it is preferable that the ambient image is instantly erased when the eco-drive level decreases to less than x1. Moreover, the control is performed so that the time frequency of the ambient image is stepwisely reduced as the driving state changes from the eco-drive state to the transition state and to the non-eco drive state. By this control, the driver can naturally recognize that the eco-drive level is lowering.

As described above, in the display apparatus for vehicle according to this embodiment, the ambient image G1 is displayed on the determination display portion 24, as illustrated in FIG. 4, by the control of the display controller (display control unit) 34. Furthermore, when it is determined by the eco-drive level calculator (eco-drive level determination unit) 32 or the eco-drive state calculator 33 that the eco-drive level at driving the vehicle has changed, the display of the ambient image G1 is changed. By the above control performed by the display controller 34, the driver can be prompted to direct the driver's line of vision toward the determination display portion 24 displayed inside the peripheral visual field region, and the driver can naturally recognize the eco-drive level meter displayed in the detail display portion 23 outside of the peripheral visual field region. The driver can easily acquire information concerning the amount of depression of the accelerator from the eco-drive level meter.

Moreover, the eco-drive level at driving the vehicle can be calculated based on the difference between the recommended depression amount and the actual depression amount of the accelerator by the eco-drive state calculator (eco-drive state calculation unit) 33. Furthermore, the vehicle driving state can be set to any one of the "eco-drive state," the "transition state," and the "non-eco drive state" according to the eco-drive level. When the driving state is the eco-drive state, the ambient image G1 displayed in the determination display portion 24 provided inside the peripheral visual field region is displayed in a horizontally-long elliptical profile illustrated in FIG. 6(a). When the driving state changes to the transition state, the ambient image G1 is changed to an elliptical profile with a narrow horizontal width as illustrated in FIG. 6(b). In other words, when the driving state changes to the transition state, the ambient image G1 which is illuminated at the eco-drive state is changed so that the illuminated region in the ambient image G1 is contracted toward the center. This causes the driver's line of vision to be directed substantially to the center of the peripheral visual field region, thus causing the driver to recognize the information of the eco-drive level displayed in the detail display portion 23 outside of the peripheral visual field region with natural movement of the driver's line of vision.

Furthermore, when the vehicle travel state changes from the transition state to the non-eco drive state, the display controller (display control unit) 34 can be configured to erase the ambient image G1 as illustrated in FIG. 6(c). With such a configuration, it is possible to cause the driver to clearly recognize the change of the ambient image G1, thus reliably directing the driver's line of vision toward the detail display portion 23.

By the way, in a process to display a warning for a seatbelt not being fastened, a lamp is turned on if the warning occurs to inform the driver of the warning. In contrast to such an informing process, in this embodiment, the driver is informed by narrowing the illuminated region of the ambient image G1 so that the illuminated region is contracted toward the center to be narrowed and by lowering the time frequency. In other words, the driver is caused to sense a change in the eco-drive level by changing the ambient image G1 from the state where the ambient image G1 is displayed conspicuously for the driver to the state where the ambient image G1 is displayed inconspicuously. Accordingly, it is possible to guide the driver's line of vision toward the ambient image G1 in a natural movement without distracting the driver. Furthermore, it is possible to cause the driver to naturally recognize the displayed details of the eco-drive level meter displayed in the detail display portion 23 which is located below the ambient image G1.

Moreover, when the vehicle driving state changes from the eco-drive state to the transition state and from the transition state to the non-eco drive state, the display controller (display control unit) 34 can change the ambient image instantly. Accordingly, it is possible to cause the driver to immediately recognize the change of the driving state to the transition state or non-eco drive state, thus prompting the driver to quickly take measures for eco-drive.

Furthermore, when the vehicle driving state changes from the eco-drive state to the transition state, the display controller (display control unit) 34 can change the time frequency in the process of changing the brightness of the ambient image. Accordingly, it is possible to cause the driver to immediately recognize the change of the driving state to the transition state or non-eco drive state, thus prompting the driver to quickly take measures for eco-drive.

In this embodiment, as shown in FIG. 7(b), the time frequency of the brightness of the ambient image can be stepwisely changed according to a change in the eco-drive level. However, the present invention is not limited to this example, and the time frequency of the brightness of the ambient image is controlled so as to change in a linear manner as indicated by reference sign P1 in FIG. 7(b).

Second Embodiment

Next, a description is given of a display apparatus for vehicle according to a second embodiment of the present invention. In the second embodiment, when the vehicle driving state changes from the eco-drive state to the transition state or non-eco drive state, the display style of the eco-drive level meter displayed in the detail display portion 23 is changed, so that the current recommended depression amount and actual depression amount can be displayed so as to be easily compared.

Figure 10:
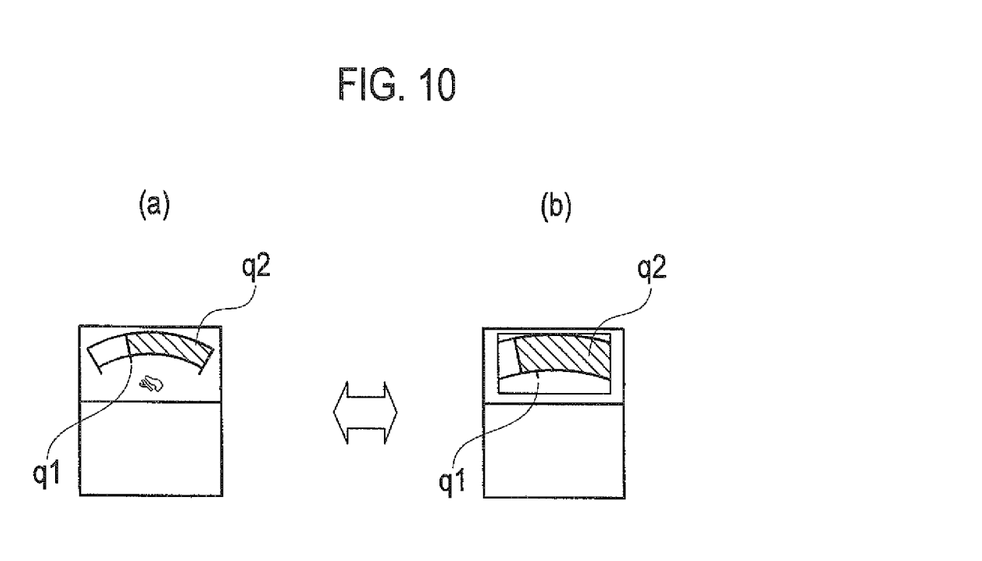
FIG. 10 is an explanatory view illustrating display styles of the eco-drive level meter in the display apparatus for vehicle according to a second embodiment of the present invention.

Hereinafter, the second embodiment is described in detail with reference to FIG. 10. FIG. 10 is an explanatory view illustrating a change in the eco-drive level meter showing the amount of depression of the accelerator. FIG. 10(a) illustrates a display style at the eco-drive state, and FIG. 10(b) illustrates a display style for the transition state and non-eco drive state.

As illustrated in FIG. 10(a), when the vehicle driving state is the eco-drive state, the image of the eco-drive level meter displayed in the detail display portion 23 includes an image showing the comparison between the recommended depression amount and the actual depression amount as a whole image (normal display). Reference sign q1 shown in FIG. 10(a) indicates the recommended depression amount of the accelerator, and the scale denoted by reference sign q2 indicates the actual depression amount of the accelerator. By checking the eco-drive level meter displayed as the whole image, the driver can easily recognize that the eco-drive level is high.

When the vehicle driving state changes to the transition state or non-eco drive state, as illustrated in FIG. 10(b), the eco-drive level meter is displayed as an zoomed-in image showing the comparison between the recommended depression amount and the actual depression amount. To be specific, the part showing the relationship between the recommended depression amount, which is indicated by the reference sign q1, and the scale (the actual depression amount) denoted by reference sign q2 is zoomed-in and displayed. Accordingly, by checking the zoomed-in eco-drive level meter, the driver can recognize that the eco-drive level is lowered in a style easier to understand.

Figure 11:
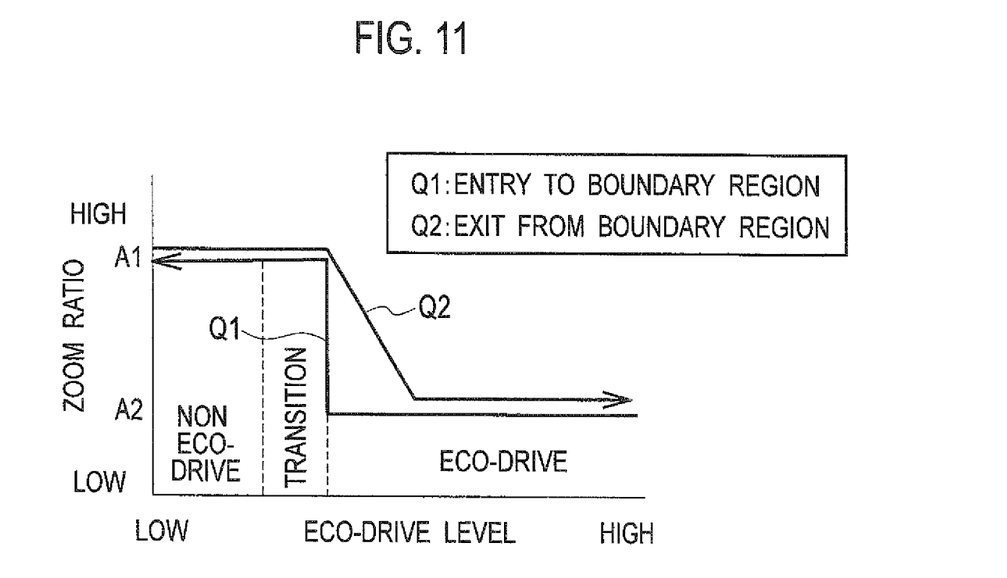
FIG. 11 is a characteristic diagram showing the relationship between the eco-drive level and the zoom ratio of the eco-drive level meter in the display apparatus for vehicle illustrated in FIG. 10.

FIG. 11 is a characteristic diagram showing the relationship between the eco-drive level and the zoom ratio of the eco-drive level meter. Herein, the transition from the eco-drive state to the transition state is shown as a process of entry into the boundary region which is indicated by Q1. The transition from the transition state to the eco-drive state is shown as a process of exit from the boundary region, which is indicated by Q2. When the eco-drive level is lowered and the driving state changes from the eco-drive state to the transition state, the zoom ratio of the eco-drive level meter is instantly increased as represented by Q1. To be specific, the zoom ratio is changed from A2 for the normal state to A1 for the transition or non-eco drive state. Moreover, when the eco-drive level increases and the driving state changes from the transition state to the eco-drive state, the zoom ratio of the eco-drive level meter is gradually reduced as represented by Q2. To be specific, the zoom ratio is gradually lowered from the zoom ratio A1 for the transition state to the zoom ratio A2 for the normal display.

In this embodiment, when the vehicle driving state changes from the eco-drive state to the transition state, the eco-drive level meter can be displayed as a zoomed-in display image. Accordingly, it is possible to display in a style easy for the driver to understand how different the current amount of depression of the accelerator is from the recommended depression amount. Moreover, the image of the eco-drive level meter is instantly changed from the whole display image to the zoomed-in image when the eco-drive level is lowering. It is therefore possible to cause the driver to reliably sense a change in the zoom ratio, thus naturally guiding the driver's line of vision to the eco-drive level meter.

Furthermore, when the driving state changes from the transition state to the eco-drive state, the zoom ratio of the eco-drive level meter is gradually lowered, and the image of the eco-drive level meter is switched to the whole display (the normal display). The eco-drive level meter can be returned to the original display without giving the driver uncomfortable feeling.

As described above, with the display apparatus for vehicle according to the second embodiment, when the vehicle driving state changes from the eco-drive state to the transition state, the display controller (display control unit) 34 zooms in a main portion of the eco-drive level meter displayed in the detail display portion 23 substantially at the center of the indicator 12. The driver can therefore easily understand how different the recommended depression amount is from the actual acceleration depression amount. It is therefore possible to prompt the driver to perform such accelerator operation that does not allow transition to the non-eco drive state.

Moreover, the display controller (display control unit) 34 instantly changes the whole display to the zoomed-in display when the driving state changes from the eco-drive state to the transition state. This allows the driver to easily sense a change in the vehicle driving state to the transition state. On the other hand, the display controller (display control unit) 34 gradually changes the zoomed-in display to the whole display when the vehicle driving state changes from the transition state to the eco-drive state. The display of the eco-drive level meter does not change quickly, so that the image of the eco-drive level meter can be returned to the original display style without giving the driver uncomfortable feeling.

Third Embodiment

Next, a description is given of a third embodiment of the present invention. In the third embodiment, when the vehicle driving state changes from the eco-drive state to the transition state, the control is made so that both the ambient image and eco-drive level meter are displayed within the determination display portion 24. Hereinafter, the description is given of a concrete display example with reference to FIG. 12.

Figure 12:
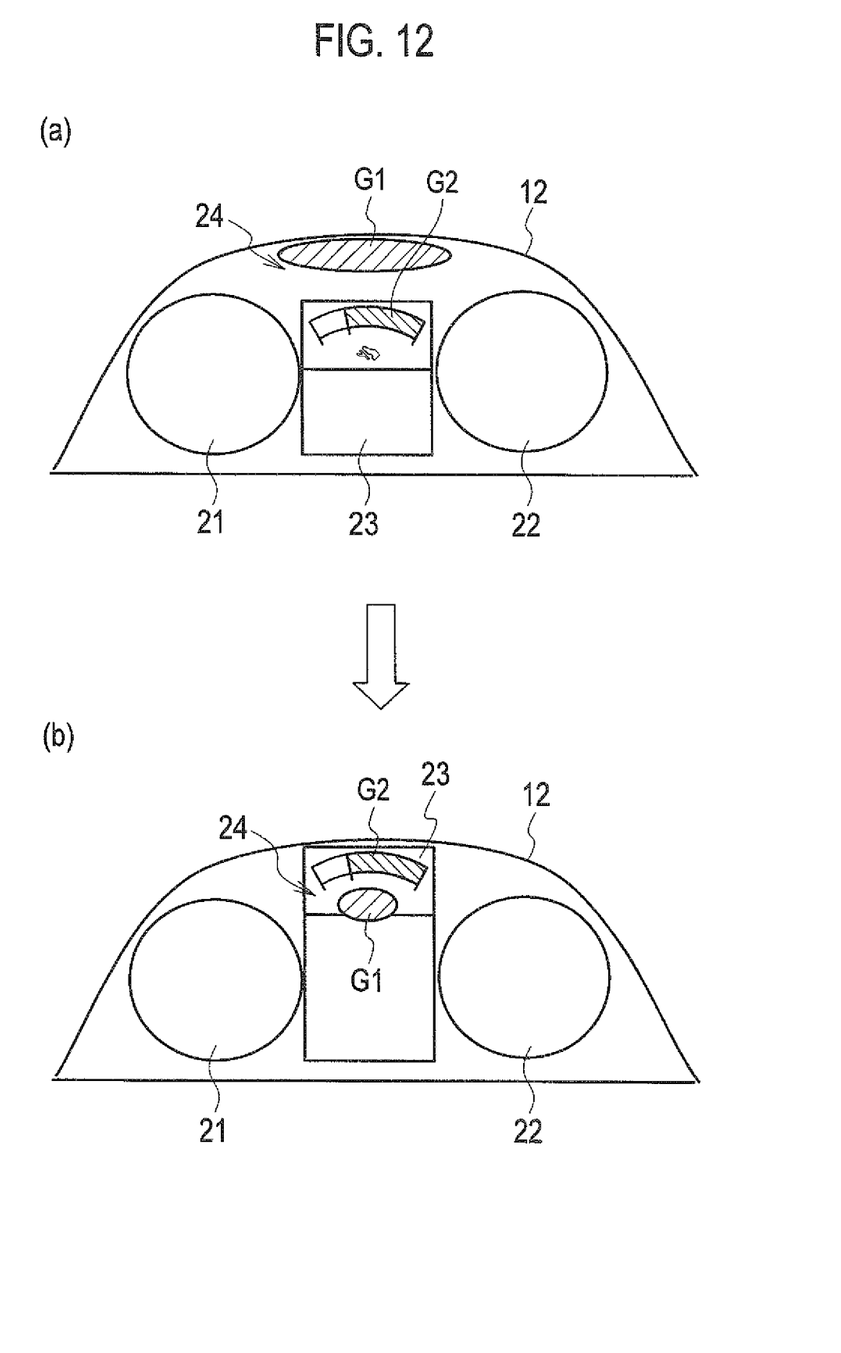
FIG. 12 is an explanatory view illustrating an ambient image and an eco-drive level meter which are displayed in an indicator in a display apparatus for vehicle according to a third embodiment of the present invention.

FIG. 12(a) is an explanatory view illustrating a display state of the indicator 12 when the vehicle driving state is the eco-drive state. To be specific, in this example, the engine tachometer 21 and speedometer 22 are displayed, and in the middle therebetween, the detail display portion 23 is provided. The determination display portion 24 is located above the detail display portion 23. In the determination display portion 24, the ambient image G1 horizontally long is displayed, and in the detail display portion 23, an eco-drive level meter G2 is displayed.

On the other hand, when the vehicle traveling state changes from the eco-drive state to the transition state, as illustrated in FIG. 12(b), the detail display portion 23 displaying the eco-drive level meter G2 moves upward into the peripheral visual field region. To be specific, the display of the indicator 12 is changed so that the determination display portion 24 displaying the ambient image G1 and the detail display portion 23 displaying the eco-drive level meter G2 are both located inside the peripheral visual field region.

Accordingly, the driver can easily see the ambient image G1 and eco-drive level meter G2 without greatly moving the line of vision. When the eco-drive level is lowered, it is possible to naturally guide the driver's line of vision to the ambient image G1 without distracting the driver. Furthermore, it is possible to cause the driver to see the eco-drive level meter G2 without changing the line of vision of the driver who is checking the ambient image G1. In such a manner, the display controller (display control unit) 34 can locate the detail display portion 23 inside the peripheral visual field region when the driving state is determined by the eco-drive state calculator 33 to be the transition state. The driver's line of vision can be thereby naturally directed to the ambient image G1 and eco-drive level meter G2.

Hereinabove, the contents of the present invention are described with the embodiments. However, it is obvious to those skilled in the art that the present invention is not limited to the above description and can be variously modified and improved. For example, the configuration of each unit of the display apparatus for vehicle described above can be replaced with units having arbitrary configurations including similar functions.

The entire contents of Japanese Patent Application No. 2012-076744 (application date: 29 Mar., 2012) are incorporated herein by reference.

INDUSTRIAL APPLICABILITY

In the display apparatus for vehicle according to the present invention, the ambient image displayed inside the peripheral visual field region allows the driver to bring the determination display portion into sight while looking ahead. When the determination result changes, the ambient image is changed. The driver can therefore recognize the change in the eco-drive level. In other words, it is possible to naturally guide the driver's line of vision to the determination display portion. Furthermore, it is possible to cause the driver to understand the information indicating the eco-drive level displayed in the detail display portion without uncomfortable feeling.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

REFERENCE SIGNS LIST

11 ENGINE CONTROLLER
12 INDICATOR
13 VEHICLE SPEED SENSOR
14 STROKE SENSOR
21 ENGINE REVOLUTION COUNTER
22 SPEEDOMETER
23 DETAIL DISPLAY PORTION
24 DETERMINATION DISPLAY PORTION
31 VEHICLE SITUATION DETECTOR
32 ECO-DRIVE LEVEL CALCULATOR (ECO-DRIVE LEVEL DETERMINATION UNIT)
33 ECO-DRIVE STATE CALCULATOR
34 DISPLAY CONTROLLER
G1 AMBIENT IMAGE
G2 ECO-DRIVE LEVEL METER

The invention claimed is:

1. A display apparatus for vehicle comprising:
a speedometer that measures speed of a vehicle;
an eco-drive level determination unit that determines an eco-drive level at driving the vehicle based on a difference between a recommended depression amount which is a recommended amount of depression of an accelerator and an actual depression amount which is an actual amount of depression of the accelerator that the driver depresses,
a determination display portion located inside a peripheral visual field region of the driver that displays information indicating a result of the determination by the eco-drive level determination unit;
a detail display portion located outside of the peripheral visual field region that displays information representing a comparison between the recommended depression amount and the actual depression amount; and
a display control unit that controls display in the determination display portion and the detail display portion,
wherein the display control unit performs the following controls of:
(A) setting the display in the determination display portion to ambient display in which contrast of an outline region is lower than contrast inside the outline region, and
(B) changing the ambient display according to change in the eco-drive level based on the result of the determination by the eco-drive level determination unit.

2. The display apparatus for vehicle according to claim 1, further comprising:
an eco-drive state calculation unit that determines which state the eco-drive level at driving the vehicle is classified into among an eco-drive state, a transition state, and a non-eco drive state,
wherein the transition state corresponds to a range (a) set in the case where the difference is larger than a difference corresponding to the eco-drive state,
wherein the non-eco drive state corresponds to a range (b) set in the case where the difference is larger than a difference corresponding to the transition state, and
wherein the display control unit changes the ambient display according to the eco-drive level determined by the eco-drive state calculation unit.

3. The display apparatus for vehicle according to claim 1, wherein the display control unit changes a displayed area of the determination display portion according to the result of determination by the eco-drive level determination unit.

4. The display apparatus for vehicle according to claim 3, wherein the display control unit changes a display profile of the determination display portion according to the result of determination by the eco-drive level determination unit and erases the display when the eco-drive level is determined to be the non-ma drive state by the eco-drive level determination unit.

5. The display apparatus for vehicle according to claim 2, wherein the display control unit performs a control to change in a stepwise manner the display in the determination display portion.

6. The display apparatus for vehicle according to claim 2, wherein when the eco-drive level at driving the vehicle is determined to be the transition state, the display control unit performs a control to change a time frequency of the image displayed in the determination display portion.

7. The display apparatus for vehicle according to claim 1, wherein when the eco-drive level at driving the vehicle is determined to be the transition state, the display control unit zooms in the detail display portion.

8. The display apparatus for vehicle according to claim 7,
wherein, when the eco-drive level at driving the vehicle changes from the eco-drive state to the transition state, the display control unit zooms in the detail display portion,
wherein, when the eco-drive level at driving the vehicle changes from the transition state to the eco-drive state, the display control unit zooms out the detail display portion, and
wherein the change to zoom in is performed in a stepwise manner, and the change to zoom out is a gradual decrease along with an increase in the eco-drive level.

9. The display apparatus for vehicle according to claim 1, wherein, when the eco-drive level at driving the vehicle is determined to be the transition state, the display control unit locates the detail display portion inside the peripheral visual field region.

10. A display apparatus for vehicle comprising:
a speedometer configured to measure speed of a vehicle;
an eco-drive level determination means configured to determine an eco-drive level at driving the vehicle based on a difference between a recommended depression amount which is a recommended amount of depression of an accelerator and an actual depression amount which is an actual amount of depression of the accelerator that the driver depresses,
a determination display portion located inside a peripheral visual field region of the driver and configured to display information indicating a result of the determination by the eco-drive level determination means;
a detail display portion located outside of the peripheral visual field region and configured to display information representing a comparison between the recommended depression amount and the actual depression amount; and
a display control means configured to control display in the determination display portion and the detail display portion, wherein the display control means performs the following controls of:
- (A) setting the display in the determination display portion to ambient display in which contrast of an outline region is lower than contrast inside the outline region, and
- (B) changing the ambient display according to change in the eco-drive level based on the result of the determination by the eco-drive level determination means.

11. The display apparatus for vehicle according to claim 2, wherein the display control unit changes a displayed area of the determination display portion according to the result of determination by the eco-drive level determination unit.

12. The display apparatus for vehicle according to claim 3, wherein the display control unit performs a control to change in a stepwise manner the display in the determination display portion.

13. The display apparatus for vehicle according to claim 4, wherein the display control unit performs a control to change in a stepwise manner the display in the determination display portion.

14. The display apparatus for vehicle according to claim 3, wherein when the eco-drive level at driving the vehicle is determined to be the transition state, the display control unit performs a control to change a time frequency of the image displayed in the determination display portion.

15. The display apparatus for vehicle according to claim 4, wherein when the eco-drive level at driving the vehicle is determined to be the transition state, the display control unit performs a control to change a time frequency of the image displayed in the determination display portion.

* * * * *